Aug. 6, 1968     J. R. SPENCER ET AL     3,395,858
ONE-PIECE RESILIENT COMPRESSOR VALVE

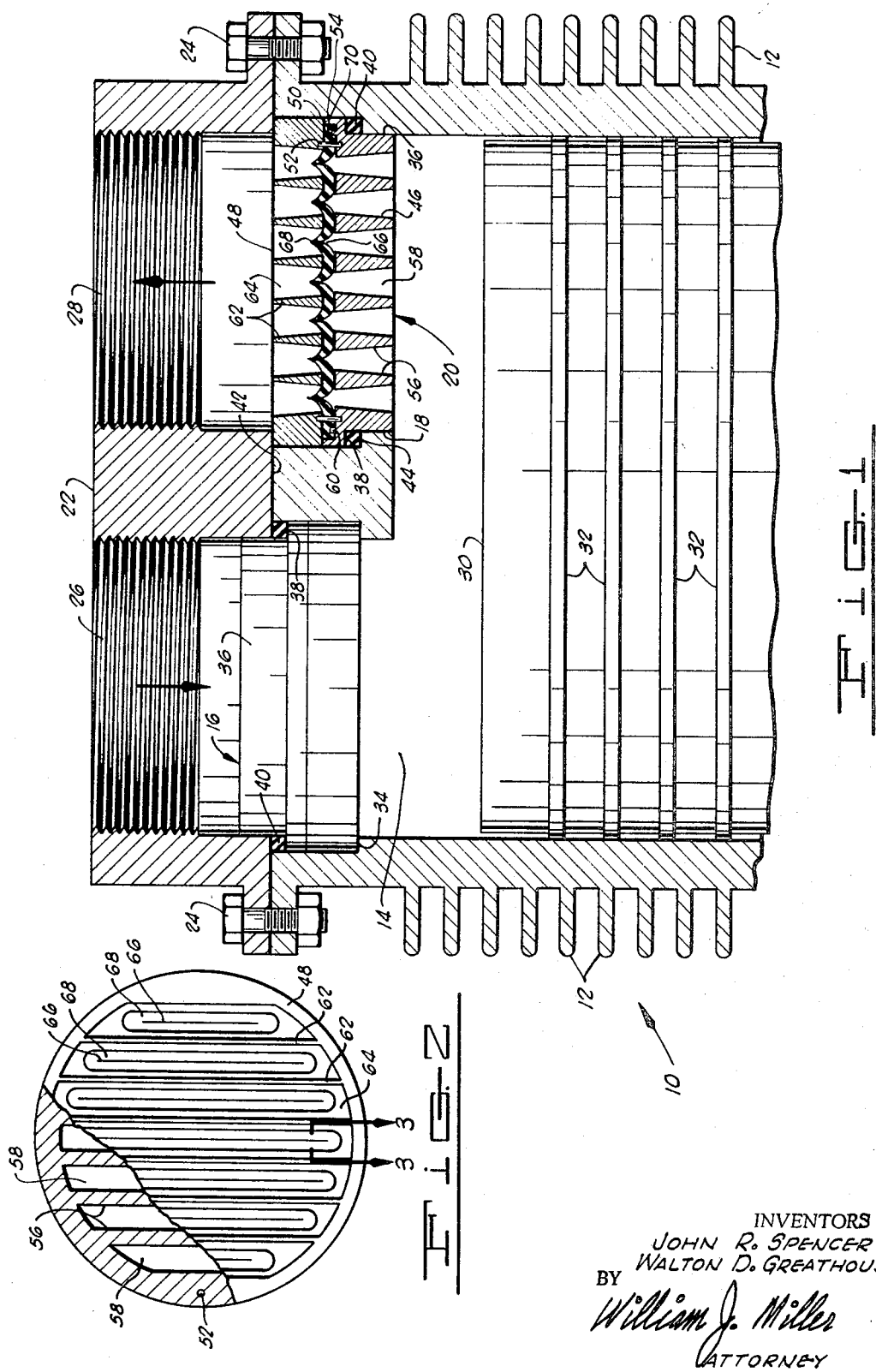

Filed Sept. 21, 1964     2 Sheets-Sheet 2

INVENTORS
JOHN R. SPENCER &
WALTON D. GREATHOUSE
BY *William J. Miller*
ATTORNEY 3,395,858
ONE-PIECE RESILIENT COMPRESSOR VALVE
John R. Spencer and Walton D. Greathouse, Houston, Tex., assignors to Continental Oil Company, Ponca City, Okla., a corporation of Delaware
Filed Sept. 21, 1964, Ser. No. 397,706
11 Claims. (Cl. 230—231)

ABSTRACT OF THE DISCLOSURE

This invention comprises a valve having a one-piece resilient and elastic, non-metallic valve member which is disposed between upstream and downstream support members. The valve member and support members are provided with aligned flow apertures and passageways, respectively, so that the fluid flowing through the valve does not change directions.

---

This invention relates generally to improvements in valves for controlling fluid flow. More particularly, but not by way of limitation, this invention relates to an improved one-way valve having a non-metallic, resilient valve member for use in gas compressors.

Valves used in gas compressors in the past have been constructed almost entirely from metal and may be classified into three basic categories or types. The first category embraces valves of the poppet type. Poppet valves usually include a valve member having an enlarged head portion for engaging a valve seat to form a seal and a stem portion of reduced diameter which is encircled by a compression type coil spring. The coil spring is arranged to urge the head portion of the valve member toward the valve seat. The second category is the ribbon or strip type valve. Strip valves are one of the most popular forms of compressor valves and most often include a flexible strip of steel placed over rectangular openings in the valve seat. The strips are urged toward the seat by ribbon steel springs which are held in position by milled surfaces formed in the valve cover. The third category comprises the plate-type valves which generally include a flexible valve plate covering the flow passageway in the valve seat. The valve plate and valve seat are held in adjacent relationship by a centrally located fastener. Flow passageways through plate-type valves usually consist of one or more annular and possibly concentric ports formed in the seat. The valve cover used with such valves is relieved to permit the valve plate to bend or flex upwardly relative to the seat, uncovering the flow ports therein. The valve plate is biased toward the seat by either a plate-type spring having approximately the same dimensions as the valve plate or by a plurality of small, spaced compression springs. The biasing springs are disposed between the valve cover and the valve plate.

Valves constructed in accordance with the foregoing description have several inherent disadvantages. For example, the efficiency of the valve is low because of the energy loss during fluid flow which results from the changes in direction that must occur as the fluid passes through the valve. Furthermore, the metal springs may work harden and fail in a relatively short operating time due to the high frequency of valve operation. Another difficulty resulting from the use of springs is that the valve will not open until sufficient pressure is built up in the compressor to overcome the spring force closing the valve. Due to the magnitude of such pressure, high energy pulsations are transmitted throughout the system each time the valve opens. The high energy pulsations are reflected in the system as severe vibrations or shock waves which sometimes cause physical damage to components in the system.

Metal-to-metal seals, which are incorporated in most of the aforedescribed valves, require a very close fit if they are to function properly at low pressures. It is well known that the higher degree of fit required, the higher the manufacturing cost of the valve. In addition, metal-to-metal seals will leak as a result of the slightest amount of foreign matter being trapped between the valve member and seat.

Some attempts have been made in the past to construct compressor valves from resilient, non-metallic materials, such as rubber, neoprene, etc. Non-metallic compressor valves have not been successful or, at least, have not been commercially accepted. It is believed that one of the primary reasons for the lack of commercial success has been due to their complexity and cost as compared with the commonly used metallic valves. Another reason for the lack of acceptance of non-metallic valves in gas compressors has been their inability to withstand back pressures of relatively high magnitude.

Broadly, this invention contemplates a valve including a resilient and elastic, non-metallic valve member which is disposed between upstream and downstream support members. The valve members and support members are provided with aligned flow apertures and passageways, respectively, so that the fluid flowing through the valve does not change directions. Furthermore, the valve member is provided with resilient self-supporting lobes surrounding each aperture. The lobes are biased by the inherent resiliency of the material into a position wherein opposed lobe portions are in sealing engagement closing the apertures. Fluid flow through the valve opens the apertures and results in movement of the lobes to a position wherein the apertures have a venturi shape. In addition, the lobes are responsive to a downstream pressure of higher magnitude than the upstream pressure to move to a position augmenting the sealing engagement of the lobes to prevent reverse flow through the valve.

One object of the invention is to provide an improved valve that eliminates the use of moving metal parts.

Another object of the invention is to provide an improved valve having a valve member constructed from a resilient and elastic, non-metallic material.

A further object of the invention is to provide an improved valve for use in gas compressors that increases the efficiency of the compressor by virtue of the flow characteristics of the valve.

Still another object of the invention is to provide an improved valve for use in gas compressors that can be easily and economically manufactured.

One other object of the invention is to provide an improved valve for use in gas compressors that can be quickly and easily replaced.

A still further object of the invention is to provide an improved valve that will open at low pressures and, yet, will close effectively against relatively high back pressures.

The foregoing and additional objects and advantages of the invention will become more apparent as the following description is read in conjunction with the accompanying drawing wherein like reference characters denote like parts in all views and wherein:

FIG. 1 is a fragmentary view, partly in elevation and partly in cross-section, of a pair of valves constructed in accordance with the invention installed in a gas compressor;

FIG. 2 is a top view, partly in cross-section, of one of the valves shown in FIG. 1 removed from the compressor;

Figure 3A:
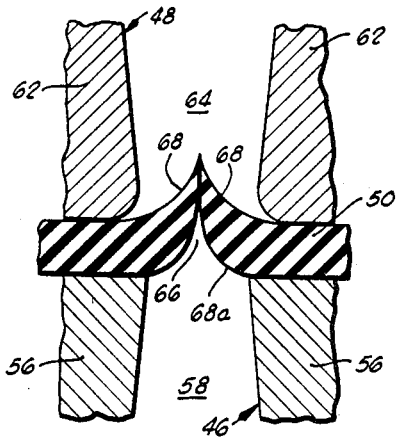
FIG. 3A is an enlarged cross-sectional view taken generally along the line 3—3 in FIG. 2.

Referring to the drawing, and to FIG. 1 in particular, shown therein and generally designated by the reference character 10 is an upper portion of a gas compressor cylinder. The exterior of the cylinder 10 is provided with a plurality of annular cooling fins 12 to aid in transferring heat generated in the cylinder 10 to the atmosphere. The upper end portion of the cylinder 10 is provided with an inlet opening 14 in which an inlet valve 16 is mounted and an outlet or discharge opening 18 in which an outlet or discharge valve 20 is mounted. A cylinder head 22 is secured to the upper end of the cylinder 10 by a plurality of threaded fasteners 24. The cylinder head 22 is provided with an inlet passageway 26 and an outlet passageway 28 which are aligned with the inlet opening 14 and the outlet opening 18, respectively, in the cylinder 10. The inlet and outlet passageways 26 and 28 in the cylinder head 22 may be threaded as illustrated or otherwise suitably constructed to receive the ends of conduits (not shown) for connecting the compressor with other components of a fluid system (not shown). A piston 30 is reciprocally mounted in the cylinder 10 and is provided with suitable annular sealing rings 32 which form a fluid tight seal between the piston 30 and the interior wall of the cylinder 10.

The inlet valve 16 and outlet valve 20 are identical in structure, however, the outlet valve 20 is inverted relative to the position of the inlet valve 16 when installed in the cylinder 10. The inlet opening 14 is counterbored to provide an upwardly facing shoulder 34 which supports the lower end of the inlet valve 16 in the upper end of the cylinder 10. It can be observed that the inlet and outlet valves 16 and 20 are each provided with a portion 36 of reduced diameter forming a shoulder 38 thereon. An annular gasket 40, which may be constructed from resilient material, is disposed between the upwardly facing (as installed in the cylinder 10) shoulder 38 on the inlet valve 16 and the lower surface 42 of the cylinder head 22 to prevent the compressed gases from bypassing the inlet valve 16. The outlet opening 18 in the cylinder 10 is counterbored to provide an upwardly facing shoulder 44. As previously mentioned, the outlet valve 20 also includes the shoulder 38, but in the installation of the outlet valve 20 in the cylinder 10 the shoulder 38 faces downwardly. A second resilient annular gasket 40 is disposed between the shoulder 38 on the outlet valve 20 and the upwardly facing shoulder 44 in the outlet opening to prevent the escape of gases between the cylinder 10 and the outlet valve 20. The gasket 40 encircling the outlet valve 20 is retained in compression by the engagement of the lower surface 42 of the cylinder head 22 with the valve 20.

The arrangement and construction of the inlet valve 16 is such that fluids may pass from the inlet passageway 26 through the valve 16 into the inlet opening 14 of the cylinder 10, but cannot flow therethrough in the opposite direction. Similarly, the arrangement and construction of the outlet valve 20 is such that fluids may pass from the cylinder 10 through the outlet opening 18 therein, through the valve 20 and thence into the outlet passageway 28 in the cylinder head 22, but cannot flow therethrough in the opposite direction.

The structure of the inlet valve 16 and the outlet valve 20 are identical, as previously mentioned, and for this reason only the structure of the outlet valve 20, which is shown in cross-section in FIG. 1, will be described in detail. The valve 20 includes an upstream member 46, a downstream member 48, and a valve member 50 which is disposed between and retained by the members 46 and 48. A plurality of collimating pins 52 extend through the valve member 50 and into the upstream and downstream members 46 and 48, respectively. The collimating pins 52 are provided to assure alignment between the parts of the valve during assembly.

The upstream member 46 includes the outer section of reduced diameter 36 which forms the shoulder 38. The upstream member 46 has the end opposite to the portion of reduced diameter 36 counterbored providing a peripheral rim 54. The counterbore is sufficiently deep to accommodate the thickness of the valve member 50. The upstream member 46 includes a plurality of parallel-spaced, tapered members 56 which extend thereacross and substantially form chords of the circle defined by the exterior of the upstream member 46. Adjacent tapered members 56 define a plurality of fluid passageways 58 which are convergent in the downstream direction. The upstream member 46 is also provided with an annular lug 60 which projects from the bottom of the counterbore located therein in the downstream direction. The lug 60 has a diameter slightly less than the diameter of the peripheral rim 54 and is concentric therewith. The purpose of the lug 60 will become more apparent as the description proceeds.

The downstream member 48 has an outside diameter which is substantially equal to the diameter of the peripheral rim 54 of the upstream member 46. A plurality of relatively narrow members 62 extend across the downstream member 48 and are arranged to generally coincide in spacing and position with the members 56 of the upstream member 46. Preferably, the members 62 are tapered so that passageways 64 located between adjacent members 62 are divergent in the downstream direction.

The valve member 50 is preferably formed from a resilient and elastic material, such as natural or synthetic rubber or plastic. The thickness and outside diameter of the valve member 50 are sized to fit within the counterbore in the upstream member 46. The thickness of the valve member 50 may be slightly greater than the depth of the counterbore so that valve member 50 will be positively engaged by the members and 46 and 48. A plurality of slits or apertures 66 extend through the valve member 50 and are spaced so that when the valve member 50 is assembled with the upstream and downstream members 46 and 48, the apertures 66 will be aligned with the passageways 58 and 64. Each of the apertures 66 is surrounded by a flexible lobe 68 which projects from the valve member 50 into the corresponding passageway 64 in the downstream member 48. An annular groove 70, which is located in the upstream side of the valve member 50, engages the lug 60 formed in the upstream member to prevent relative movement between the peripheral portion of the valve member 50 and the upstream and downstream members 46 and 48. As is clearly shown in FIG. 1, the valve member 50 has its periphery engaged and trapped by the peripheral rim 54 on the upstream member 46 and the upstream face of the downstream member 48. The members 56 of the upstream member 46 and the members 62 on the downstream member 48 engage opposed surfaces of the valve member 50 to securely retain the valve member 50 in a fixed position relative to the members 46 and 48.

FIG. 2 is a top or plan view of the valve 20 removed from the cylinder 10 and clearly illustrates the shape of the downstream member 48 and the shape of the members 62 which extend thereacross. The extent of the apertures 66 and the lobes 68 are also illustrated in FIG. 2. A portion of the upstream member 46 is shown in cross-section in FIG. 2 and it should be understood that the members 56 of the upstream member 46 are disposed directly beneath the corresponding members 62 of the downstream member 48. Likewise, the passageways 58 in the upstream member 46 are disposed directly below the passageways 64 in the downstream member 48.

Figure 3B:
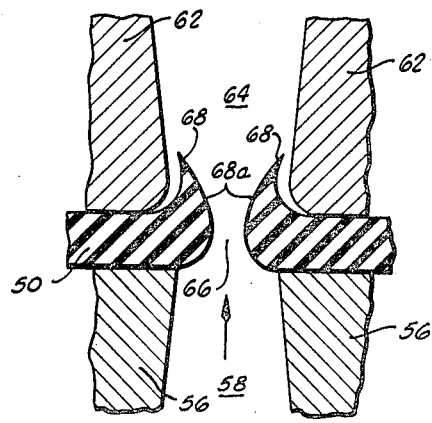
FIG. 3B is a view similar to FIG. 3A, but showing a portion of the valve in the open or flow condition.

The preferred structure of the flexible lobes 68 surrounding the apertures 66 in the valve member 50 can best be seen in FIG. 3A and 3B. As shown in FIG. 3A, the lobe 68 is in the position it occupies when no fluid is flowing through the valve. In this position, opposed portions of the lobe 68 are in engagement due to the resiliency of the material forming the valve member 50, but it should be pointed out that only the downstream tips of the lobe 68 are in contact. It can be seen in FIG. 3A that the aperture 66 converges from the width of the downstream end of the passageway 58 to zero opening at the point of contact of the lobe portions due to the shape of the surface 68a of the lobe 68. When fluid flows through the valve in the direction indicated by the arrow in FIG. 3B, the tips of the lobe 68 are biased apart so that the surface 68a of the lobe 68 defines a venturi shape. The lobes 68 are self-supporting and do not engage the members 62 in the downstream member 48 while fluid is flowing through the valve.

OPERATION

Figure 3C:
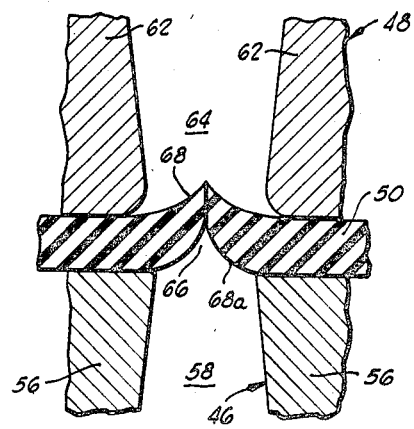
FIG. 3C is a view similar to FIG. 3A, but showing a portion of the valve in the position that results from applying back pressure thereto.

It is believed that the operation of the valves can best be understood by reference to FIGS. 3A, 3B, and 3C wherein a single operating portion of the valve has been enlarged to show the details of construction and operation more clearly. The fluid flow direction through the valve will be from the passageway 58 in the upstream member 46 to the passageway 64 in the downstream member 48. When no fluid is flowing through the passageways, the flexible lobes 68 will be biased by the resiliency of the material forming the valve member 50 into a position wherein the aperture 66 is closed. Due to the configuration of the surfaces 68a of the lobes 68, it can be seen that pressure in the passageway 58 will act over a relatively large area of the lobes 68. The apertures 66 will open with the application of a very low pressure in the passageway 58. The apertures 66 open at relatively low pressures as compared with any of the commonly used spring-loaded valves, and will open gradually under the influence of such low pressure. As previously mentioned, spring-loaded valves require an initial build-up of pressure and then open suddenly as the spring force is overcome. Fluid flowing through the valve moves the lobes 68 to the open flow position shown in FIG. 3B. The venturi defined by the lobes 68 permits straight through flow of the fluid passing through the valve with very little energy loss.

Upon a cessation of fluid flow from the passageway 58 into the passageway 64, the flexible lobes 68 are biased into an initial sealing engagement as shown in FIG. 3A due to the resiliency of the material forming the valve member 50. Should the pressure in the passageway 64 be greater than the pressure in the passageway 58, i.e., the downstream pressure be greater than the upstream pressure, the lobes 68 will assume the position shown in FIG. 3C. Due to the configuration of the flexible lobes 68, it can be seen that the force exerted on the valve member 50 by pressure in the passageway 64 will be imposed on the valve member 50 as a compressive load. It should therefore be apparent that a relatively high differential pressure can be supported by the valve member 50 even though it is constructed from a resilient and elastic material.

Valves constructed in accordance with the invention are useful in controlling or limiting flow in a fluid circuit to a single direction and it has been found that the valve can be used to great advantage in a gas compressor. As previously mentioned in connection with FIG. 1, the valves 16 and 20 are identical in construction but inverted in the cylinder 10. When the piston 30 is moved relatively away from the cylinder head 22, a low pressure area is created in the cylinder 10 which draws fluid through the passageway 26, the valve 16, and into the inlet opening 14. During this downward movement of the piston 30, the valve 20 will be closed as shown in FIG. 3A or 3C to prevent fluid from entering the cylinder 10 from the outlet passageway 28. Movement of the piston 30 in the cylinder 10 toward the cylinder head 22 causes the valves 16 and 20 to work in reverse, i.e., the valve 16 closes, assuming the position as shown in FIG. 3C, and the valve 20 opens as shown in FIG. 3B. Opening of the valve 20 permits fluid flow through the outlet passageway 28 into a compressor tank (not shown) or other portions of the fluid system (not shown) with which the compressor may be connected.

Figure 4:
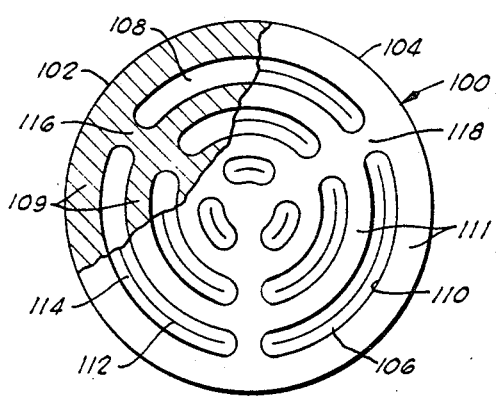
FIG. 4 is a view similar to FIG. 2, but illustrating another embodiment of the valve.

FIG. 4 is a top view of another embodiment of a valve, which is also constructed in accordance with the invention, and is generally designated by the reference character 100. As shown therein, the valve 100 includes an upstream member 102, which is shown in cross-section, and a downstream member 104. A resilient and elastic valve member 106 is disposed between and retained by the upstream and downstream members 102 and 104 in a manner similar to the method used in retaining the valve member 50 of the valves 16 and 20. The upstream member 102 includes a plurality of concentric passageways 108 which are defined by spaced-concentric members 109. The downstream member 104 includes a plurality of concentric passageways 110 which are coincident with the passageways 108 in the upstream valve member 102 and are defined by spaced-concentric members 111. The resilient valve member 106 includes a plurality of arcuate slits or apertures 112 which are arranged to coincide with the passageways 108 and 110 in the upstream and downstream members 102 and 104, respectively. Also, each of the slits or apertures 112 is defined by a flexible lobe 114 which is constructed as shown in FIG. 3A. A plurality of connecting members 116 and 118 join the spaced-concentric members 109 and 111, respectively. The members 116 and 118 are located so that they engage opposite surfaces of the valve member 106 between the ends of adjacent arcuate apertures 112. The function and operation of the valve 100 is identical in all respects to the function and operation of the valves 16 and 20 and is completely interchangeable therewith.

Figure 5:
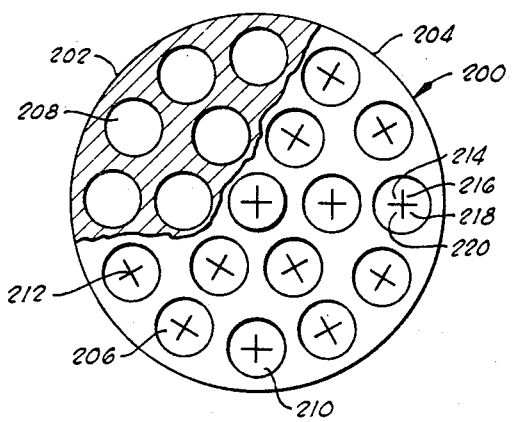
FIG. 5 is a view similar to FIG. 2, but illustrating still another embodiment of the valve, also constructed in accordance with the invention.

FIG. 5 illustrates another embodiment of a valve constructed in accordance with the invention and generally designated by the reference character 200. The valve 200 includes an upstream member 202 and a downstream member 204. A resilient and elastic valve member 206 is disposed between and retained by the upstream and downstream members 202 and 204 in a manner similar to that disclosed in connection with the construction of the valves 16 and 20. The upstream member 202 includes a plurality of circular passageways 208 and the downstream member 204 includes a plurality of coincident circular passageways 210. The resilient valve member 206 includes a plurality of X-shaped slits or apertures 212 which are coincident with the passageways 208 and 210 in the upstream and downstream members 202 and 204, respectively. Each of the apertures 212 is bounded by flexible lobes 214, 216, 218, and 220. The function and operation of the valve 200 is basically the same as the function and operation of the valve 16 and 20. The valve 200 may be inserted in the cylinder 10 in lieu of the valves 16 and 20 if desired.

All of the aforedescribed valve embodiments may be advantageously used with fluids containing foreign particles because all operating portions of the valve member 50 are constructed from resilient material. It can be appreciated that if a foreign particle should become embedded on one of the lobes 68 in one of the apertures 66, the resiliency of the material forming the valve member 50 will permit the deformation of the lobe 68 so that a seal may still be obtained to close the aperture 66. Furthermore, the use of resilient material for forming the valve member reduces the erosive effect of fluids containing solids as they pass through the valve. Additionally, valves constructed in accordance with the invention contain no springs or metal portions which may become work hardened and result in valve failure.

As is well known to those skilled in the art, a venturi-shaped passageway is highly efficient due to the small loss of energy as the fluid passes therethrough. It should be emphasized that fluid flowing from the passageway 58 into the passageway 64 through the aperture 66 does not change directions as is true of fluid flowing through the springloaded valves previously described. Manifestly, such straight fluid flow will increase the efficiency of the valve as compared with the spring-loaded types because no energy is lost to changes in directions of the fluid flow through the valves. It can be readily appreciated that the overall efficiency of a gas compressor will be increased by the use of valves constructed in accordance with the invention due to the increase in efficiency of the valves. The valves can be quickly and easily replaced in the compressor due to each valve being a complete unit. Also, the individual valve units can be easily repaired because they comprise only three basic parts which are connected only by the collimating pins.

It should be understood that the embodiments shown and described herein are presented by way of example only and that many modifications and changes can be made thereto without departing from the spirit of the invention or the scope of the annexed claims.

What we claim is:

1. A one-way valve for controlling fluid flow comprising:
   an upstream member having a plurality of passageways extending therethrough parallel to the direction of fluid flow through the valve;
   a downstream member having a plurality of passageways extending therethrough parallel to the direction of fluid flow through the valve and aligned with the passageways in said upstream member; and
   a one-piece valve member constructed from a resilient and elastic non-metallic material disposed between and engaged with said upstream and downstream members whereby said valve member is retained in said valve, said valve member having
      a plurality of apertures extending therethrough aligned with the passageways in said upstream and downstream members, and
      a flexible lobe surrounding each said aperture and projecting into the passageways in said downstream member, said lobes having free end portions biased by the resiliency of said valve member into a position wherein opposed free end portions are in sealing engagement closing said apertures when no fluid is flowing through said valve and being moved by fluid flowing through the valve to a position opening said apertures wherein said apertures have a venturi shape, said lobes being responsive to a downstream pressure of a higher magnitude than the upstream pressure to augment the sealing engagement of said lobes.

2. A one-way valve for controlling fluid flow comprising:
   an upstream member having an upstream and downstream face, having a plurality of passageways extending therethrough parallel to the direction of fluid flow through the valve, and having a lug portion located on said downstream face near the periphery thereof and projecting therefrom in a direction parallel to said fluid flow;
   a downstream member having a plurality of passageways extending therethrough parallel to the direction of fluid flow and aligned with the passageways in said upstream member;
   a one-piece valve member constructed from a resilient and elastic non-metallic material disposed between the downstream face of said upstream member and said downstream member, said valve member having
      a plurality of linear apertures extending therethrough aligned with the passageways in said upstream and downstream members,
      a flexible lobe surrounding each said aperture and projecting into the passageways in said downstream member, said lobes having free end portions biased by the resiliency of said valve members into a position wherein opposed free end portions are in sealing engagement closing said apertures when no fluid is flowing through said valve, and being moved by fluid flowing through the valve to a position opening said apertures wherein said apertures have a venturi shape, said lobes being responsive to a downstream pressure of a higher magnitude than the upstream pressure to augment the sealing engagement of said lobes, and a groove in said valve member cooperable with said lug to prevent movement of the peripheral portion of said valve member relative to said upstream and downstream members; and
      a plurality of collimating pins extending through said valve member and into said upstream and downstream members to assure the alignment of said members.

3. A one-way valve for controlling fluid flow comprising:
   an upstream member having upstream and downstream faces and having a plurality of tapered passageways extending therethrough parallel to the direction of fluid flow through the valve, said passageways being convergent toward the downstream face;
   a one-piece valve member constructed from a resilient and elastic non-metallic material and disposed in engagement with the downstream face of said upstream member, said valve member having
      a plurality of apertures extending therethrough aligned with said passageways,
      a flexible lobe surrounding said apertures and projecting in a downstream direction therefrom, said lobes having free end portions biased by the resiliency of the valve member into a position wherein opposed free end portions are in sealing engagement closing said apertures when no fluid is flowing, said free ends being moved by fluid flow through said valve into a position opening said apertures wherein said apertures have a venturi shape, and said lobes being responsive to a downstream pressure of a higher magnitude than the upstream pressure to augment the sealing engagement of said lobes; and
   a downstream member having upstream and downstream faces and having a plurality of passageways extending therethrough parallel to the direction of fluid flow and aligned with the passageways in said upstream member, said upstream face being in engagement with said valve member intermediate said lobes to retain said valve member between said upstream and downstream members, said passageways in said downstream member having a minimum dimension substantially larger than the convergent end of the passageways in said upstream member, whereby said lobes can move to their open position without contacting the downstream member surrounding the passageways therein.

4. The valve of claim 3 wherein
said upstream member includes a continuous lug portion located on said downstream face near the periphery thereof and projecting therefrom toward said downstream member; and wherein
said valve member has a groove therein cooperable with said lug to prevent movement of the peripheral portion of said valve member relative to said upstream and downstream members.

5. The valve of claim 3 and also including a plurality of collimating pins extending through said valve member and into said upstream and downstream members to assure the proper alignment of said members.

6. The valve of claim 3 wherein
said upstream member includes a continuous lug located on said downstream face near the periphery thereof and projecting therefrom toward said downstream member;
said valve member has a groove therein cooperable with said lug to prevent movement of the peripheral portion of said valve member relative to said upstream and downstream members; and, wherein
said valve also includes a plurality of collimating pins extending through said valve member and into said upstream and downstream members to assure the proper alignment of said members.

7. The valve of claim 6 wherein
said upstream, downstream, and valve members are generally circular in cross-section in a plane extending perpendicular to the direction of fluid flow through said valve; and wherein,
each of said passageways has a circular cross-section in a plane extending perpendicularly to the direction of fluid flow through said valve.

8. The valve of claim 6 wherein
said upstream, downstream, and valve members are generally circular in cross-section in a plane extending perpendicular to the direction of fluid flow through said valve; and wherein,
each of said passageways extends transversely across said valve thereby substantially defining a plurality of parallel chords of the respective members.

9. The valve of claim 6 wherein
said upstream, downstream, and valve members are generally circular in cross-section in a plane extending perpendicular to the direction of fluid flow through said valve; and wherein,
each of said passageways and apertures are arcuate and concentric with respect to the circular cross-section of said members.

10. In a gas compressor having a cylinder having inlet and outlet openings in one end thereof, a piston reciprocably mounted in the cylinder, and a cylinder head member having inlet and outlet passageways aligned with the inlet and outlet openings in the cylinder and mounted on one end of the cylinder, the improvement comprising
a one-way inlet valve mounted in the inlet opening in the cylinder; and
a one-way outlet valve mounted in the outlet opening in the cylinder;
each of said valves including
an upstream member having a plurality of passageways extending therethrough parallel to the direction of fluid flow through the valve;
a downstream member having a plurality of passageways extending therethrough parallel to the direction of fluid flow through the valve and aligned with the passageways in said upstream member; and
a one-piece valve member constructed from a resilient and elastic non-metallic material disposed between and engaged with said upstream and downstream members whereby said valve member is retained in said valve, said valve member having
a plurality of linear apertures extending therethrough aligned with the passageways in said upstream and downstream members, and
a flexible lobe surrounding each said aperture and projecting into the passageways in said downstream member, said lobes having free end portions biased by the resiliency of said valve member into a position wherein opposed free end portions are in sealing engagement closing said apertures when no fluid is flowing through said valve and being moved by fluid flowing through the valve to a position opening said apertures wherein said apertures have a venturi shape, said lobes being responsive to a downstream pressure of a higher magnitude than the upstream pressure to augment the sealing engagement of said lobes.

11. In a gas compressor having a cylinder having inlet and outlet openings in one end thereof, a piston reciprocably mounted in the cylinder, and a cylinder head member having inlet and outlet passageways aligned with the inlet and outlet openings in the cylinder and mounted on one end of the cylinder, the improvement comprising
a one-way inlet valve mounted in the inlet opening in the cylinder; and
a one-way outlet valve mounted in the outlet opening in the cylinder;
each of said valves including
an upstream member having upstream and downstream faces and having a plurality of tapered passageways extending therethrough parallel to the direction of fluid flow through the valve, said passageways being convergent toward the downstream face;
a one-piece valve member constructed from a resilient and elastic non-metallic material and disposed in engagement with the downstream face of said upstream member, said valve member having
a plurality of linear apertures extending therethrough aligned with said passageways, and
a flexible lobe surrounding said apertures and projecting in a downstream direction therefrom, said lobes having free end portions biased by the resiliency of the valve member into a position wherein opposed free end portions are in sealing engagement closing said apertures when no fluid is flowing, said free ends being moved by fluid flow through said valve into a position opening said apertures wherein said apertures have a venturi shape, and said lobes being responsive to a downstream pressure of a higher magnitude than the upstream pressure to augment the sealing engagement of said lobes; and
a downstream member having upstream and downstream faces and having a plurality of passageways extending therethrough parallel to the direction of fluid flow and aligned with the passageways in said upstream member, said upstream face being in engagement with said valve member intermediate said lobes to retain said valve member between said upstream and downstream members, said passageways in said downstream member having a minimum dimension substantially larger than the convergent end of the passageways in said upstream member, whereby said lobes can move to their open position without contacting the downstream member surrounding the passageways therein.

References Cited

UNITED STATES PATENTS

| | | | |
|---|---|---|---|
| 2,524,764 | 10/1950 | Burke | 137—512.4 X |
| 2,636,510 | 4/1953 | Mercier et al. | 137—512.1 |
| 3,148,697 | 9/1964 | Carr | 137—512.1 X |
| 3,175,577 | 3/1965 | King | 137—516.21 X |
| 3,209,700 | 10/1965 | Waldherr | 92—98 X |

FOREIGN PATENTS

| | | |
|---|---|---|
| 56,903 | 11/1939 | Denmark. |
| 92,936 | 5/1896 | Germany. |

WILLIAM F. O'DEA, *Primary Examiner.*

D. J. ZOBKIW, *Assistant Examiner.*